(12) United States Patent  (10) Patent No.: US 7,666,374 B2
Grochowski  (45) Date of Patent: Feb. 23, 2010

(54) METHOD FOR CLEANING EXHAUST GASES PRODUCED BY A SINTERING PROCESS FOR ORES AND/OR OTHER METAL-CONTAINING MATERIALS IN METAL PRODUCTION

(75) Inventor: Horst Grochowski, Lindnerstraβe 163, 46149-Oberhausen (DE)

(73) Assignee: Horst Grochowski, Oberhausen (DE)

( * ) Notice: Subject to any disclaimer, the term of this patent is extended or adjusted under 35 U.S.C. 154(b) by 38 days.

(21) Appl. No.: 11/883,862

(22) PCT Filed: Feb. 8, 2006

(86) PCT No.: PCT/EP2006/001083

§ 371 (c)(1),
(2), (4) Date: Aug. 7, 2007

(87) PCT Pub. No.: WO2006/084671

PCT Pub. Date: Aug. 17, 2006

(65) Prior Publication Data

US 2008/0219908 A1    Sep. 11, 2008

(30) Foreign Application Priority Data

Feb. 8, 2005    (DE) .................. 10 2005 005 818

(51) Int. Cl.
*B01D 53/34* (2006.01)
*B01D 53/38* (2006.01)
*B01D 53/50* (2006.01)
*B01D 53/56* (2006.01)
*B01D 53/64* (2006.01)
*B01D 53/68* (2006.01)
*B01D 53/72* (2006.01)

(52) U.S. Cl. .................. 423/210; 423/239.1; 423/242.1; 423/244.01; 423/244.07; 423/240 S; 423/245.1; 423/DIG. 16

(58) Field of Classification Search ................. 423/210, 423/239.1, 242.1, 244.01, 244.07, 240 S, 423/245.1, DIG. 16

See application file for complete search history.

(56) References Cited

U.S. PATENT DOCUMENTS

| 2,519,874 A | 8/1950 | Berg |
| 5,603,907 A | 2/1997 | Grochowski et al. |
| 7,198,767 B1 * | 4/2007 | Grochowski ............. 423/213.2 |

FOREIGN PATENT DOCUMENTS

| DE | 37 32 567 | 11/1988 |
| WO | WO 01/17663 | 3/2001 |

* cited by examiner

*Primary Examiner*—Timothy C Vanoy
(74) *Attorney, Agent, or Firm*—Fay Sharpe LLP; Brian E. Turung

(57) ABSTRACT

The invention relates to a process for cleaning exhaust gases produced by a sintering process of metal-containing waste. The sintering exhaust gas includes one or more harmful substances which are eliminated in at least two steps by at least one adsorption and/or absorption agent in a single moving bed in a moving bed reactor system. The moving bed includes a particle layer (stage I) disposed above a flow input area and below an adsorption layer (stage II) of the moving bed. One or more harmful substances in the sintering exhaust gas are absorptively or adsorptively bound to potassium and/or sodium compounds and the harmful substances are trapped by adhesion in the flow input area or the Particle layer (stage I) of the moving bed. The substantial removal of $NO_x$ and the adsorptive or absorptive removal of dioxins and furans takes place in the adsorption layer (stage II) in the moving bed.

29 Claims, 3 Drawing Sheets

METHOD FOR CLEANING EXHAUST GASES PRODUCED BY A SINTERING PROCESS FOR ORES AND/OR OTHER METAL-CONTAINING MATERIALS IN METAL PRODUCTION

The invention relates to a method for cleaning exhaust gases produced by an ore sintering process in metal production. In particular, the invention is directed to a process for cleaning exhaust gases produced by a sintering process of metal-containing waste, such as from recycling processes, or from ores in metal production, in which the ore material, possibly associated with other metal-containing materials, undergoes a sintering of the feedstock together with an at least partly solid fuel and at least partial combustion of the solid material and a low-temperature pyrolysis process. The sintering exhaust gas contains at least some of the following harmful substances in addition to $CO_2$ $CO$ $O_2$ $H_2O$:$NO_x$, $SO_2$, HCl, Hg, dioxins, furans, dust and sublimatable or condensable residues from the low-temperature pyrolysis process, heavy hydrocarbons and/or heavy metals. Possibly after a precleaning stage, the harmful components are essentially eliminated from the sintering exhaust gases in at least two steps by at least one adsorption and/or absorption agent in a single moving bed in a moving bed reactor system. At least one of the gas-phase components $SO_2$, HCl, sublimatable or condensable residues, heavy hydrocarbons and heavy metals and possibly potassium and/or sodium compounds is bound absorptively or adsorptively and the particulate components are trapped by adhesion in the flow input area and possibly in an adjacent lower layer of the moving bed. The substantial denitrification and possibly the adsorptive or absorptive removal of gas-phase components such as dioxins and furans takes place in the layer area adjacent the flow input area and in the adjacent lower layer in the fluidized bed.

BACKGROUND OF THE INVENTION

When ore material is sintered, it is mixed with a fine-particulate, carbon-containing solid and deposited on a sintering belt on which it is transported to a discharge end, and while it is advancing on the sintering belt at least some of the solid material is combusted. Alternatively, the starting material is formed into pellets or briquettes and then sintered. Combustion air is supplied. During sintering, the feedstock undergoes a low-temperature pyrolysis process, and at least some of it is subjected to a combustion process that has the effect of agglomerating the feedstock in larger lumps, that is to say it is sintered. Exhaust gases are given off in considerable quantities by the feedstock in the combustion and low-temperature pyrolysis process, to which the combustion air is added, and besides $CO_2$, possibly $O_2$, $H_2O$, and or $N_2$ they contain a wide variety of harmful components. These particularly include nitrogen oxides ($NO_x$), $SO_2$, HCl, dioxins, furans, dust, and sublimatable or condensable residues from the low-temperature pyrolysis process, heavy hydrocarbons and/or heavy metals.

Air pollution prevention studies have revealed that the exhaust gases from sintering belts for example are responsible for a very significant portion of the total pollutants that are created in the steelmaking process. For example, in terms of dioxins and furans, fractions exceeding 90% of the pollutants were detected in the corresponding emissions in the iron and steelmaking process. Due to the extraordinarily large quantities of exhaust gases given off by sintering belt systems, until now it has not been possible to clean the gases satisfactorily without effort of the order that would render the overall cost of steelmaking more expensive. In particular, because of the different proportions of harmful components in the sintering belt exhaust gas, together with their widely varying compositions depending on the feedstock, besides their widely differing reactions and the diversity of the available cleaning methods, it has been necessary to link several cleaning steps in a consecutive series.

Thus for example, entrainment processes have been suggested with downstream filtering of entrained particles and further downstream catalytic oxidation to reduce dioxins. The catalyst was severely degraded in such processes, the catalyst surface being covered in a deposit of organic hydrocarbons (Final report 50 441-5/217 "Reduction of dioxin emissions from sintering systems" commissioned by the German Federal Environmental Agency, December 2002). Another exhaust gas cleaning method for sintering belt systems was suggested in WO 01/17663, to the effect that the sintering exhaust gas was cleaned in an entrainment cleaning stage followed by an adsorption cleaning stage, and in which ground, high-grade activated carbon with a relatively small particle size is added to the exhaust gas in the entrainment stage, so that an entrainment cloud is formed. The finely particulate adsorption medium reacts in the entrainment phase with some of the harmful components that are to be removed from the sintering belt exhaust gas. However, in the post-reaction stage after the entrainment stage the flue dust was not precipitated onto a fabric filter or electrofilter, but onto the input side of a counterflow moving bed reactor, where the flue dust was precipitated on the particles of the moving bed particle material, that is on the surface or in the interstitial volumes thereof. The sintering belt gas then passed through the particle layer of the counterflow moving bed reactor, consisting for example of activated carbon, so that the sintering belt gas was precleaned in an entrainment phase before it underwent cleaning by adsorption. The entrainment cleaning process upstream of the moving bed reactor requires the use of a second particulate cleaning agent, which however does not prevent the disadvantageous degradation of the catalyst in the moving bed.

Especially when it is most important to remove the $NO_x$ from the sintering exhaust gas, other polluting components such as $SO_2$ and HCl have proven particularly inconvenient when the $NO_x$ is to be removed from the exhaust gas by a catalyst, because they and other pollutants in the sintering gas are "catalyst poisons" when it comes to $NO_x$ removal.

SUMMARY OF THE INVENTION

In view of the above, the object of the invention is reduce or largely eliminate the catalyst-degenerating effect of other harmful components, particularly $SO_2$ and/or condensable hydrocarbons in the process of cleaning sintering exhaust gases, particularly $NO_x$, and at the same time to simplify the process. One process that is suggested to solve this object of the invention is a process for cleaning exhaust gases produced by a sintering process of metal-containing waste, such as from recycling processes, or from ores in metal production, in which the ore material, possibly associated with other metal-containing materials, undergoes a sintering of the feedstock together with an at least partly solid fuel and at least partial combustion of the solid material and a low-temperature pyrolysis process. The sintering exhaust gas contains at least some of the following harmful substances in addition to $CO_2$ $CO$ $O_2$ $H_2O$:$NO_x$, $SO_2$, HCl, Hg, dioxins, furans, dust and sublimatable or condensable residues from the low-temperature pyrolysis process, heavy hydrocarbons and/or heavy metals. Possibly after a precleaning stage, the harmful components are essentially eliminated from the sintering exhaust gases in at least two steps by at least one adsorption and/or absorption agent in a single moving bed in a moving bed reactor system. At least one of the gas-phase components $SO_2$, HCl, sublimatable or condensable residues, heavy hydrocarbons and heavy metals and possibly potassium and/or sodium compounds is bound absorptively or adsorptively and the particulate components are trapped by adhesion in the flow input area and possibly in an adjacent lower layer of the moving bed. The substantial denitrification and possibly the adsorptive or absorptive removal of gas-phase components such as dioxins and furans takes place in the layer area adjacent the flow input area and in the adjacent lower layer in the fluidized bed.

It has been found that even a precleaning stage in which for example the $SO_2$ is eliminated to a certain degree with calcium hydroxide, would not be sufficient because when the residual quantities of $SO_2$ and/or HCl remaining in the exhaust gas come into contact with ammonia, which must be used to convert the $NO_x$, and the catalyst is a carbon-containing absorption and/or adsorption medium such as activated carbon, they may cause the grains of the $NO_x$ catalyst to swell up (popcorning). This effect occurs when crystals of ammonium sulphate or ammonium chloride form in the porous catalyst. The crystals that are formed in the pore system expand and destroy the structure of the catalyst. As a result, the catalyst is not only consumed, it is disintegrated. Reducing the size of the particles in the catalyst material leads to a loss of pressure, which in turn increases the cost of the cleaning process.

The invention is based on the fundamental idea of carrying out a two-stage exhaust gas cleaning process in a single moving bed reactor, in which the first stage takes place in the input area and the second cleaning stage takes place in the subsequent layers of the adsorption and/or absorption medium. Surprisingly, it has been shown that a two-stage cleaning process in a single moving bed for sintering exhaust gases is even possible if the exhaust gas contains or still contains significant concentrations of $SO_2$ and/or HCl when it enters the flow area of the moving bed reactor system, which is preferably functioning in a counterflow direction. It is therefore not necessary to implement a highly sophisticated precleaning stage for $SO_2$ and HCl to remove almost all of the $SO_2$ and HCl from the sintering exhaust gas beforehand. On the contrary, any $SO_2$ and HCl that slips through the precleaning stage is eliminated in the moving bed reactor system without significantly hindering the cleaning process for $NO_x$ or having any negative effect on the catalyst used therefor, despite its aggressive effect on such a catalyst. Even alkaline compounds contained in the sintering exhaust gas that reach the moving bed reactor system despite the effect of an upstream cleaning stage and which are precipitated as crystals by sublimation have been shown to be innocuous for the purposes of the process of the invention, even though alkaline compounds are also considered to be catalyst poisons.

If the fluidised bed reactor system is operated in counterflow mode, as is preferred, that is to say the absorption and/or adsorption medium flows through the reactor from the top down while the gas to be cleaned flows through the reactor from the bottom up, the bed depth required for the first cleaning stage is able to be optimised. In particular, it may be adapted to the prevailing conditions, such as the quantity of dust and/or the quantity of the catalyst poisons in the sintering exhaust gas that must be removed in the first cleaning stage. The perfusion pressure loss in the sintering exhaust gas when it passes through the perfusion depth or a partial depth of the moving bed is preferably used to control the layer thickness of the first cleaning stage. It is also possible to keep this layer depth constant if this is desired. In this case, the moving rate of the adsorption and/or absorption agent is increased or reduced by the moving bed reactor system itself. Instead of control by means of pressure loss, control may also be exerted according to the damage to the adsorption and/or absorption agent caused by the components that attack the catalyst.

For the purposes of precleaning the sintering exhaust gas before it enters the moving bed reactor system, a bag filter or an electrofilter and/or a flue gas scrubber is used for preference. In addition to or instead of the above, a finely divided reaction and/or adsorption agent such as lime dust and/or activated carbon dust may be added to the sintering exhaust gas in an entrainment flow in order to remove at least some of the harmful components $SO_2$ and HCl from the gas before it enters the moving bed reactor system. The precleaned sintering exhaust gas preferably has an $SO_2$ content of less than 100 mg per standard cubic meter, and particularly no more than 5 mg per standard cubic meter, when it enters the moving bed reactor system.

For the purposes of the invention, the term adsorption is used to refer to a process in which one or more component(s) is/are adsorbed directly out of the exhaust gas. For the purposes of the invention, the term absorption means that substances originating in the exhaust gas to be cleaned undergo a chemical reaction before they are adsorbed.

Depending on the composition of the sintering exhaust gas, adsorption and/or absorption agents such as activated carbon (charged or uncharged), or mixtures of carbon-containing, uncharged or charged adsorption and/or absorption agents, particularly activated carbon with a reagent for acid pollutants, such as lime, are preferred.

The sorption process may take place in various operational modes, irrespective of the adsorption and/or absorption agent used:

Either in a single pass, that is to say that the individual particle layers pass through the fluidized bed reactor once, and are not used again in the process by incremental withdrawal at the bottom end of the reactor. Fresh sorption agent is added to a moving bed reactor from the top for incremental replenishment. The method is recommended for sorption agents with very small stoichiometry factors and/or low solid loads of the fluid to be cleaned, particularly with low dust loads.

If the solid loads, particularly dust loads in the fluid are relatively high and/or if the stoichiometry factor of the sorption agent is less favourable, the sorption agent may be passed through the sorption reactor several times. The sorption agent may then undergo treatment for reuse after each pass. This treatment may be for example:

Screening, for example with a reciprocating screen, with simultaneous or subsequent air elutriation for the purpose of erosion, eliminating undersize particles and/or dust that is binding to the sorption agent particles, Regeneration or dotation to refresh or improve the catalytic properties.

In both cases (one-time or multiple use), it is possible to achieve high overall residence times of the sorption agent in the reactor, the residence time being particularly long in the single pass mode, that is to say the moving speed of the sorption agent from entry to discharge is relatively slow. In general the sorption agent must have faster mobility through the reactor if the fluid to be cleaned has high solid fractions.

The composition of the sorption agent depends on the nature of the exhaust gases from sintering belt systems for which the method is to be used:

1. Dioxins/furans, dust or
2. Dioxins/furans, SO2, HCl and dust or
3. Dioxins/furans, $SO_2$, HCl, dust and $NO_x$.

Activated carbon is used to eliminate dioxins/furans. Calcium hydroxide is used to eliminate SO2, HCl (acid polluting components). The degree of elimination of NOx is improved particularly by charging with a substance that has catalyst-enhancing properties.

Mixtures of a carbon-containing, undoted or doted adsorption and/or absorption agent, particularly activated carbon and a reagent for acid polluting components, may be performed in the moving bed reactor by layered composition, but also by using particulate sorption agents in the form of a granulate that consists of a mixture of at least two sorption agents, one of these sorption agents is preferably an adsorption agent, particularly a carbon-containing agent, such as furnace coke (from lignite) or hard coal coke (from hard coal), or a corresponding activated coal or coke, or also an adsorption agent that does not contain carbon, such as clay minerals or zeolytes, while the at least one other sorption agent is a chemical sorption agent and preferably contains a compound of calcium, magnesium, potassium and/or sodium, calcium hydroxide being particularly preferable. Preferred feedstocks include hydrated limes originating from lime or dolomite. Hydrated limes originating from lime also contain $CaCO_3$ and CaO. Hydrated limes originating from dolomite contain Mg, Na, and/or K compounds as well as Ca compounds. The basic composition of the sorption agents consists of carbon-containing absorption/adsorption agents and calcium hydroxide. Depending on the concentrations of polluting components in the exhaust gas to be cleaned and the respective degree to which these substances must be eliminated from the cleaned gas, a greater or lesser proportion of activated coke or activated coal is considered when selecting the granulate. Preferred mixture ratios in the granulate particles between the chemical sorption and the adsorption agents may be for example between 65 to 90 percent by weight for the chemical sorption agents and between 35 to 10 percent by weight for the adsorption agents. In some cases these limits may be stretched to 20 to 95% by weight of chemical sorption agent and 80 to 5% by weight of the adsorption agent. It has proven advantageous to use 10 to 65% adsorption agent and 90 to 35% by weight chemical sorption agent.

If necessary, at least one substance enhancing the catalytic properties may be added to this basic composition by doting if the required degrees of elimination are high and the exhaust gas cleaning process is improved thereby. Charging (doting) may be effected with vanadium pentoxide, titanium oxide, tungsten compounds and the like. It may be performed on the activated carbon or calcium hydroxide components individually, or charging may be done when the granulate is produced (e.g., when pelletising). Charging may also be carried out after the granulate has been produced by a treatment with a suspension containing the catalyzing substance. Of the charging substance may be applied as a dust, because the granulate used demonstrates excellent binding properties with regard to these dusts. This charging may also be carried out and/or replenished before and/or while the gas is being cleaned in the moving bed reactor. The same applies with regard to controlling the catalytic properties of the moving bed. These charging methods represent significant inventive meaning on their own without reference to the sintering process, because they may be implemented advantageously in other gas treatment processes.

The granulate mixtures according to the invention have surprisingly good mechanical strength and may be produced with a relatively large porosity, particularly with a conductive pore system, so that the sorption processes may be completed relatively quickly, not only on the surface but also inside the particles. Additionally, relatively large proportions of carbon-containing reaction agents, such as activated carbons and/or catalytically active substances such as vanadium pentoxide, titanium oxide, tungsten compounds or similar, may be mixed together, thereby allowing high elimination rates to be achieved in respect of dioxins, furans, mercury and other heavy metals as well as $NO_x$.

As a component of the sorption agent, calcium hydroxide has proven to be particularly useful because of the readiness with which it reacts to sulphur and chlorine compounds. In fact, the strength of the particles actually increases during the sorption process, if for example carbon dioxide is present in the fluid to be cleaned, so that calcium carbonate is formed from $Ca(OH)_2$.

Sorption agents according to the invention consisting of several sorption agent components have proven to particularly advantageous in terms of manufacturability. Granulate production is particularly facilitated if it is carried out in the presence of calcium hydroxide and activated carbon. As a rule, the sorption agents may also be used in the form in which they emerge from granulation, e.g., with a granulation between 1 and 8 mm, particularly preferred granulations being between 2 and 6 mm.

In many cases, chemical sorption materials according to the invention already have an adequately porous surface by their nature, wherein a BET surface area of 50 $m^2/g$ and possibly more is preferred. Surprisingly, the porosity is easily reproducible.

A particular advantage of the sorption material of the invention consists in that the pore surface of the completed granulate behaves somewhat additively with respect to the pore surface of individual components of this substance.

The specification of a certain packing strength has proven to be a particularly important selection criterion for a variety of applications. Thus, the strength of the substance is determined not in individual grains but in a defined packed layer of grains.

Granulates consisting of a mixture of at least 2 sorption agents may also be used individually to advantage, that is to say without reference to the application of the process according to the claims, and are inventively significant in their own right.

The components to be used according to the invention that have been cited in the preceding text, are claimed in the claims and described in the embodiments are not subject to any special qualifications with regard to their size, structure, material selection or technical design, and the selection criteria known in the field may be applied without restriction.

Further details, features and advantages of the object of the invention will be evident from the sub claims and also from the following description of the associated drawing and table, in which an exemplary embodiment of a process for cleaning sintering belt exhaust gas is represented.

DETAILED DESCRIPTION OF THE INVENTION

Figure 1:
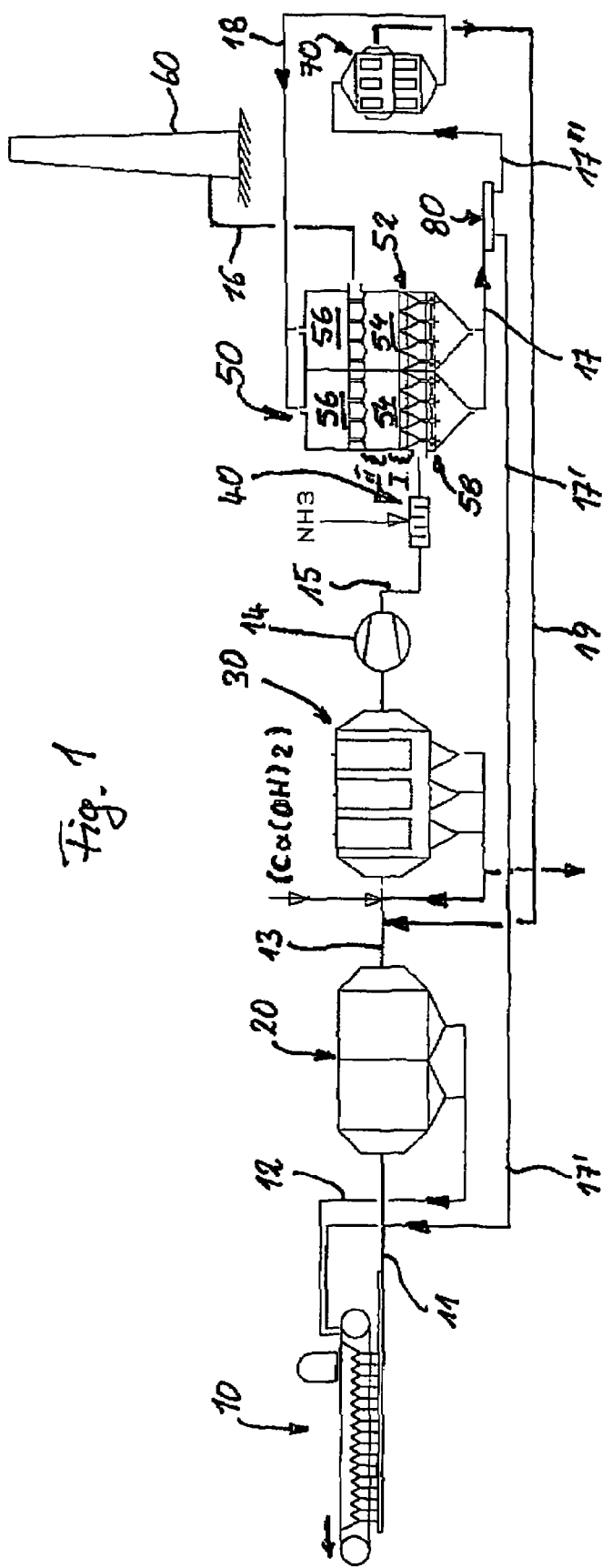
FIG. 1 is one block drawing diagram for realizing alternative capabilities of the process according to the invention.

In the embodiment of FIG. 1, the exhaust gas created on a sintering belt is passed via a pipe 11 to an electrofilter, which is known in the art. The dust that is created thereby is returned to the sintering belt via a pipe 12. The exhaust gas escaping from the electrofilter is passed via a pipe 13 to a bag filter 30, which is known in the art, and calcium hydroxide is added to the exhaust gas from pipe 13 in order to form an entrainment cloud, so that much of the $SO_2$ and HCl is bound to the calcium hydroxide. After recovery, particularly for improving the stoichiometric ratio, the filter cake that forms on the filter hoses may be reused by introducing it into the circuit and using some of it to create the entrainment cloud. A fan 14 arranged downstream of the gas outlet from bag filter 30 serves to ensure that pressure is increased sufficiently to enable the system to operate. The sintering exhaust gas escaping through pipe 15 is mixed in known manner with $NH_3$ before it is fed to the flow base in a moving bed reactor system 50 working in countercurrent flow. The base is preferably constructed in the manner described in European Patent No. 257 653 B1. The cleaned gas escaping through pipe 16 is passed directly to exhaust gas stack 60 and released into the atmosphere.

The layer 54 formed in fluidised bed reactor system 50 consists for example of activated carbon particles. Since $SO_2$, HCl and dusts have already been substantially aluminated in bag filter 30, only residual quantities of $SO_2$ and HCl, e.g. 5 mg per standard cubic meter, remain to be eliminated in the fluidized bed reactor system 50. The same applies for residual quantities of dust which have also passed through bag filter 30—including mercury and other heavy metals. The harmful substances cited above are precipitated directly in the flow area, that is in the area of flow bottom 52 and a particle layer located directly above it by adsorption, absorption and bonding (stage I). In the adsorption agent layer above it (stage II), the sintering exhaust gas essentially only contains $NO_x$, dioxins/furans, and possibly some other impurities such as PCBs and/or PAKs, which are then bound to the fresh adsorption and absorption agents flowing down from above. In this context, the $NO_x$ and $NH_3$ are broken down and essentially yield steam and nitrogen under the catalytic effect of the activated carbon.

In this embodiment, after it is removed from moving bed reactor system 50, some of the activated carbon passes through pipe 17, 17' and is added to sintering belt 10 to serve as fuel in the sintering process, otherwise it passes through pipe 17, 17' to a regeneration stage 70 such as is known in the art, and from which the regenerated adsorption agent is returned to storage hopper 56 via pipe 16. The used activated carbon is fed via pipe 17 to a screening device 80, from which the screened fine particulate is fed to the sintering belt for combustion via pipe 17', while the oversize particles is passed to reaction stage 70 via pipe 17", so that the undersize particles do not return to the moving bed reactor system. The substances that are yielded in regeneration 70, such as $SO_2$, are fed to the sintering exhaust gas before bag filter 30 via pipe 19, so that only a small quantity of harmful substances is introduced into the circuit.

Figure 2:
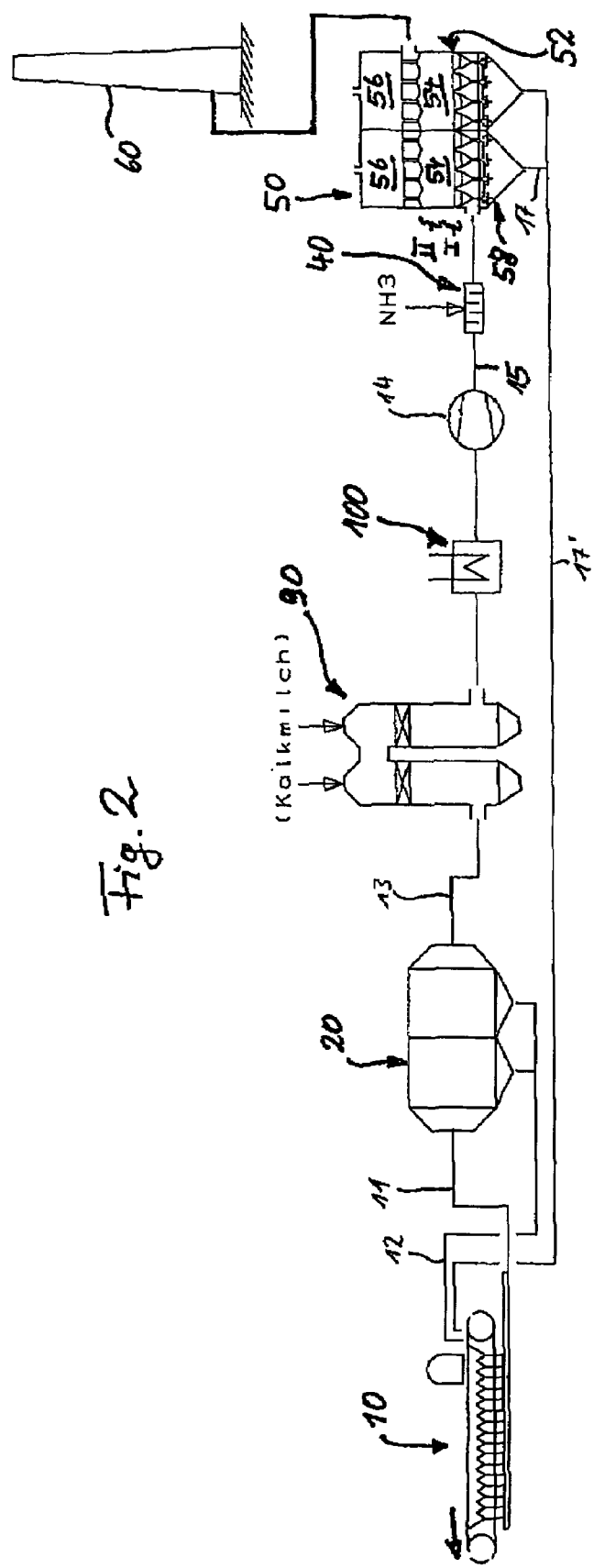
FIG. 2 is another block drawing diagram for realizing alternative capabilities of the process according to the invention.

The embodiment of FIG. 2 differs from that of FIG. 1 in that a wet scrubber 90, known in the art, is arranged downstream of electrofilter 20 instead of a bag filter, and the gas is wet scrubbed with lime slurry here to remove as much $SO_2$ and HCl as possible. Therefore, the emerging exhaust gas is first heated up again in a heat exchanger 100 before it is passed through fan 14, and ammonia supply 40 to the activated carbon adsorber (moving bed reactor system 50). The moving bed reactor system is of the same construction in all three embodiments. While fresh activated carbon is constantly fed into moving bed reactor 50, the consumed activated carbon reaching removal device 58 is passed wholesale to the sintering belt via pipes 17 and 17'. The pollutants to be removed in stages 20, 90 and 50 are essentially the same as those removed in stages 20, 30 and 50 in the first embodiment.

Figure 3:
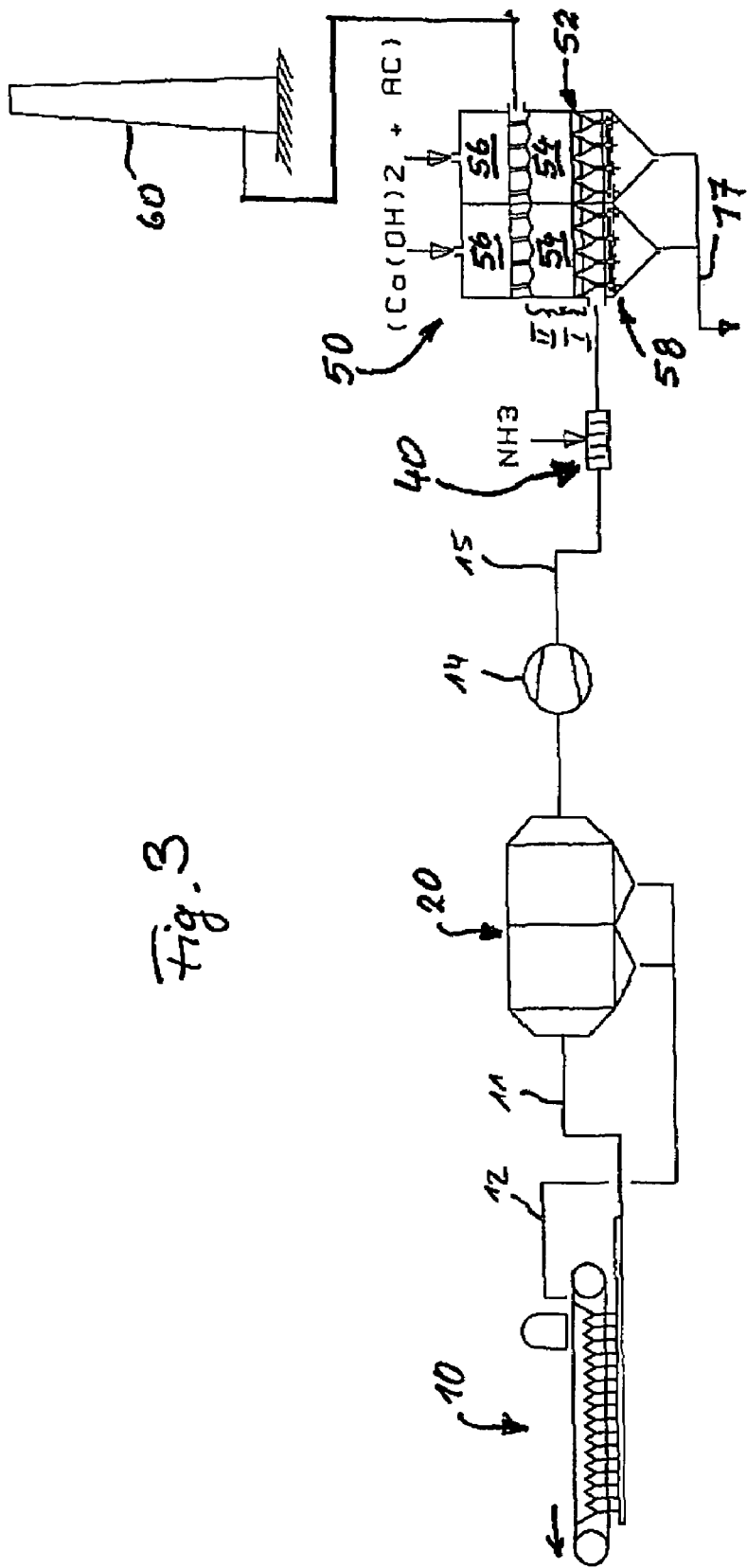
FIG. 3 is another block drawing diagram for realizing alternative capabilities of the process according to the invention.

The embodiment of FIG. 3, which is of particularly simple construction, differs from the other two embodiments in that it does not include a second precleaning stage (bag filter or wet scrubber). An upstream cleaning stage for acid components such as $SO_2$, HCl and HF is therefore not included. Instead, a special adsorption/absorption agent consisting of a granulate made from a mixture of lime and activated carbon is used in the fluidized bed, as was described in the introduction. In this way, it is possible to remove all the $SO_2$ and HCl that is present in stage I, which in turn means that the catalyst in stage II is not attacked by these components.

An example of all three system versions:

The temperature of the exhaust gas in stages I and II is typically 100° C. to 150° C. A typical exhaust gas composition before and after the exhaust gas is cleaned is shown in the table.

|  | Raw gas | Clean gas |  |
| --- | --- | --- | --- |
| Dioxin | 3 to 10 | 0.1 to 0.5 | $ng/m^3$ |
| SO2 | 700 | <50 | $mg/m^3$ |
| HCl | 50 | <5 | $mg/m^3$ |
| NOx | 350 | <100 | $mg/m^3$ |

In summary, the invention is directed to a process for cleaning exhaust gases produced by a sintering process of metal-containing waste, such as from recycling processes, or from ores in metal production, in which the ore material, possibly associated with other metal-containing materials, undergoes a sintering of the feedstock together with an at least partly solid fuel and at least partial combustion of the solid material and a low-temperature pyrolysis process. The sintering exhaust gas contains at least some of the following harmful substances in addition to $CO_2$ CO $O_2$ $H_2O$:$NO_x$, $SO_2$, HCl, Hg, dioxins, furans, dust and sublimatable or condensable residues from the low-temperature pyrolysis process, heavy hydrocarbons and/or heavy metals. Possibly after a precleaning stage, the harmful components are essentially eliminated from the sintering exhaust gases in at least two steps by at least one adsorption and/or absorption agent in a single moving bed in a moving bed reactor system. At least one of the gas-phase components $SO_2$, HCl, sublimatable or condensable residues, heavy hydrocarbons and heavy metals and possibly potassium and/or sodium compounds is bound absorptively or adsorptively and the particulate components are trapped by adhesion in the flow input area and possibly in an adjacent lower layer of the moving bed. The substantial denitrification and possibly the adsorptive or absorptive removal of gas-phase components such as dioxins and furans takes place in the layer area adjacent the flow input area and in the adjacent lower layer in the fluidized bed. The moving bed reactor system can be a counterflow system. The moving bed reactor system, the cycles in which adsorption and/or absorption agents are removed from the bottom end of the moving bed and fresh or regenerated adsorption and/or absorption agents can be added at the top end of the moving bed are carried out depending on the perfusion pressure loss in the sintering exhaust gas when it passes through the perfusion depth recess or a partial depth of the moving bed, or depending on the damage to the adsorption and/or absorption agent caused by the gas-phase and/or dust-phase components that attack the catalyst in the flow area and possibly in an adjacent lower layer. The sintering exhaust gas can be passed through an electrofilter and/or a bag filter arranged upstream of the moving bed reactor system for precleaning and/or is unloaded of at least some of the harmful components $SO_2$ and HCl in an entrainment flow with finely divided reaction and/or adsorption agents such as lime dust and/or activated carbon dust. The $SO_2$ content of the sintering exhaust gas can be reduced in the precleaning stage to about 30 to 100 mg, preferably to 5 mg per standard cubic meter. The consumed or partially consumed adsorption and/or absorption agent that is removed from the moving bed reactor system can be fed to the sintering belt for disposal. e.g., as fuel or a fuel additive. The adsorption and/or absorption agent can consists of a possibly layered, mixture of carbon-containing adsorption and/or absorption agents, particularly activated carbon, and reagents for acid pollutants, such as lime, or of a particulate sorption medium in the form of a granulate consisting of a mixture of at least two sorption media. The gas can be cleaned by the adsorption and/or absorption agent at temperatures above 80° C., preferably in a temperature range from 80° C. to 180° C., and particularly preferably in a temperature range from 100° C. to 150° C. The denitrification can take place under addition of ammonium-containing compounds, such as ammonia or urea. The adsorption and/or absorption agent removed from the moving bed reactor system can be screened, such as with a reciprocating screen with simultaneous or subsequent air elutriation for the purpose of erosion, eliminating of undersized particles and/or eliminating dust that is bound to the sorption agent particles. The adsorption and/or absorption agent can be regenerated or charged (doted) in order to refresh or improve its catalytic properties. At least one substance for improving catalytic properties can be added to the adsorption and/or absorption agent or the components thereof by way of charging (doting). The charging (dating) can be effected with vanadium pentoxide, titanium oxide, and/or tungsten compounds. The charging (doting) can be effected when producing the granulate from multiple components, such as by pelletising, or in at least one of the individual components thereof, such as activated carbon and/or calcium hydroxide. The charging (doting) can be effected after production of the adsorption and/or absorption agent by way of treatment with a suspension in which the catalyzing substance is contained or of which it consists. The charging (doting) substance can be applied to the adsorption and/or absorption agent in the form of a dust, and adheres thereto. The charging (doting) can take place before and/or during gas cleaning in the moving bed reactor by the addition of the charging (doting) medium with a gas flow, and/or is supplemented in this way. The catalytic properties of the moving bed can be controlled or regulated by the addition of the charging (doting) medium.

Legend
10 Sintering belt
11 Pipe
12 Pipe
13 Pipe
14 Fan
15 Pipe
16 Pipe
17 Pipe
17' Pipe
17" Pipe
18 Pipe
19 Pipe
20 Electrofilter
30 Bag filter
40 $NH_3$ feed unit
50 Moving bed reactor system
52 Flow base
54 Particulate layer
56 Reserve hopper
58 Removal device
60 Stack
70 Regeneration stage
80 Screening device
90 Wet scrubber
100 Heat exchanger

I claim:

1. A process for cleaning exhaust gases produced by a sintering process of metal-containing waste, wherein
   the sintering exhaust gas comprises at least one of the following harmful substances in addition to at least one of $CO_2$, CO, $O_2$, and $H_2O$:
   $NO_x$, $SO_2$, HCl, Hg, dioxins, furans, dust sublimatable or condensable residues from a low-temperature pyrolysis process, heavy hydrocarbons, heavy metals, and potassium and/or sodium compounds,
   wherein
   the harmful substances are essentially eliminated from the sintering exhaust gases in at least two steps by at least one adsorption and/or absorption agent in a single moving bed in a moving bed reactor system, the moving bed including a particle layer (stage I) disposed above a flow input area and below an adsorption layer (stage II) of the moving bed, and
   at least one of the harmful substances $SO_2$, HCl, sublimatable or condensable residues, heavy hydrocarbons, heavy metals and potassium and/or sodium compounds is bound absorptively or adsorptively and the harmful substances are trapped by adhesion in the flow input area or the Particle layer (stage I) of the moving bed, and
   the substantial removal of $NO_x$ and the adsorptive or absorptive removal of dioxins and furans takes place in the adsorption layer (stage II) in the moving bed.

2. The process as defined in claim 1, wherein the moving bed reactor system is a counterflow system.

3. The process as defined in claim 1, wherein the moving bed reactor system, cycles such that adsorption and/or absorption agents are removed from a bottom end of the moving bed and fresh or regenerated adsorption and/or absorption agents are added at a top end of the moving bed depending on at least one of (i) the perfusion pressure loss in the sintering exhaust gas when the gas passes through a perfusion depth recess or a partial depth of the moving bed, and (ii) depending on the damage to the adsorption and/or absorption agent caused by the gas-phase and/or dust-phase components that attack the catalyst in the flow area and possibly in the particle layer (stage I).

4. The process as defined in claim 1, wherein the sintering exhaust gas is passed through an electrofilter and/or a bag filter upstream of the moving bed reactor system for precleaning and/or is unloaded of at least some of the harmful substances $SO_2$ and HCl in an entrainment flow with divided reaction and/or adsorption agents selected from the group consisting of lime dust, activated carbon dust and combinations thereof.

5. The process as defined in claim 4, wherein the $SO_2$ content of the sintering exhaust gas is reduced in the precleaning stage to about 30 to 100 mg.

6. The process as defined in claim 3, wherein the consumed or partially consumed adsorption and/or absorption agent that is removed from the moving bed reactor system is fed to a sintering belt for disposal.

7. The process as defined in claim 1, wherein the adsorption and/or absorption agent comprises a mixture of carbon-containing adsorption and/or absorption agents, and reagents for acid pollutants.

8. The process as defined in claim 1, wherein the sintering exhaust gas is cleaned by the adsorption and/or absorption agent at temperatures above 80° C.

9. The process as defined in claim 1, wherein the removal of $NO_x$ takes place under addition of ammonium-containing compounds.

10. The process as defined in claim 3, wherein the adsorption and/or absorption agent removed from the moving bed reactor system is screened, with simultaneous or subsequent air elutriation.

11. The process as defined in claim 1, wherein the adsorption and/or absorption agent is regenerated or charged (doted) in order to refresh or improve its catalytic properties.

12. The process as defined in claim 11, wherein at least one substance for improving catalytic properties is added to the adsorption and/or absorption agent or the components thereof by way of charging (doting).

13. The process as defined in claim 12, wherein the substance is selected from the group consisting of vanadium pentoxide, titanium oxide, tungsten compounds, and combinations thereof 14. The process as defined in claim 11, wherein charging (doting) is effected when producing the granulate from multiple components.

15. The process as defined in claim 11, wherein charging (doting) is effected after production of the adsorption and/or absorption agent by way of treatment with a suspension comprising a catalyzing substance.

16. The process as defined in claim 11, wherein the charging (doting) substance is applied to the adsorption and/or absorption agent in the form of a dust, and adheres thereto.

17. The process as defined in claim 11, wherein charging (doting) takes place before and/or during gas cleaning in the moving bed reactor by the addition of the charging (doting) medium with a gas flow.

18. The process as defined in claim 11, wherein the catalytic properties of the moving bed are controlled or regulated by the addition of the charging (doting) medium.

19. The process as defined in claim 1, wherein the sintering exhaust gas is from ores in metal production, in which the ore material undergoes a sintering of the feedstock together with an at least partially solid fuel and at least partial combustion of the solid material and a low temperature pyrolysis process occurs.

20. The process as defined in claim 4, wherein the $SO_2$ content of the sintering exhaust gas is reduced in the precleaning stage to 5 mg per standard cubic meter.

21. The process as defined in claim 7, wherein the carbon-containing adsorption and/or absorption agents include activated carbon.

22. The process of as defined in claim 7, wherein the reagents for acid pollutants include lime.

23. The process as defined in claim 7, wherein the adsorption and/or absorption agent is a particulate sorption medium in the form of a granulate consisting of a mixture of at least two sorption media.

24. The process as defined in claim 8, wherein the gas is cleaned at a temperature from 80° C. to 180° C.

25. The process as defined in claim 8, wherein the gas is cleaned at a temperature from 100° C. to 150 ° C.

26. The process as defined in claim 9, wherein the ammonium-containing compounds are selected from the group consisting of ammonia, urea, and combinations thereof.

27. The process as defined in claim 10, wherein the agent is screened with a reciprocating screen.

28. The process as defined in claim 14, wherein the granulate is produced by pelletizing.

29. The process as defined in claim 14, wherein charging (doting) is effected by using at least one of activated carbon and calcium hydroxide.

* * * * *